(12) United States Patent
Won et al.

(10) Patent No.: US 10,097,570 B2
(45) Date of Patent: Oct. 9, 2018

(54) METHOD FOR DETECTING REAL-TIME EVENT AND SERVER USING THE SAME

(71) Applicant: Seculayer Co., Ltd., Seoul (KR)

(72) Inventors: Jong Seoung Won, Seoul (KR); Jin Sang Ryu, Seoul (KR)

(73) Assignee: Seculayer Co., Ltd., Seoul (KR)

( * ) Notice: Subject to any disclaimer, the term of this patent is extended or adjusted under 35 U.S.C. 154(b) by 63 days.

(21) Appl. No.: 15/514,874

(22) PCT Filed: Nov. 11, 2016

(86) PCT No.: PCT/KR2016/013046
§ 371 (c)(1),
(2) Date: Mar. 28, 2017

(87) PCT Pub. No.: WO2017/188535
PCT Pub. Date: Nov. 2, 2017

(65) Prior Publication Data
US 2018/0191749 A1    Jul. 5, 2018

(30) Foreign Application Priority Data

Apr. 26, 2016 (KR) .................. 10-2016-0051093

(51) Int. Cl.
*H04L 29/06* (2006.01)
*H04L 29/08* (2006.01)
(52) U.S. Cl.
CPC .......... *H04L 63/1416* (2013.01); *H04L 29/06* (2013.01); *H04L 29/08* (2013.01); *H04L 63/1425* (2013.01); *H04L 63/1458* (2013.01); *H04L 63/20* (2013.01); *H04L 67/1002* (2013.01)

(58) Field of Classification Search
CPC .................................................. H04L 63/1416
See application file for complete search history.

(56) References Cited

U.S. PATENT DOCUMENTS

| 7,251,829 B1* | 7/2007 | Pagdin | G06F 21/577 714/E11.207 |
| 7,376,969 B1* | 5/2008 | Njemanze | G06F 21/55 709/224 |

(Continued)

FOREIGN PATENT DOCUMENTS

| KR | 1020030056652 | 7/2003 |
| KR | 100684602 B1 | 2/2007 |
| KR | 1011342170000 | 4/2012 |

OTHER PUBLICATIONS

Stamouli et al.; Real-time intrusion detection for ad hoc networks; Published in: Sixth IEEE International Symposium on a World of Wireless Mobile and Multimedia Networks; Date of Conference: Jun. 16, 2005; IEEE Xplore (Year: 2005).*

(Continued)

*Primary Examiner* — Bradley Holder
(74) *Attorney, Agent, or Firm* — Husch Blackwell LLP

(57) ABSTRACT

A method for detecting a preset type of real-time event is provided. The method includes steps of: (a) a server loading or supporting other server to load a detection policy; and (b) the server detecting or supporting other server to detect an event in real-time from multiple input data by referring to the detection policy.

28 Claims, 9 Drawing Sheets

(56) References Cited

U.S. PATENT DOCUMENTS

| | | | | |
|---|---|---|---|---|
| 8,090,816 | B1* | 1/2012 | Deshmukh | G06F 21/554 709/223 |
| 8,181,253 | B1* | 5/2012 | Zaitsev | G06F 21/552 713/152 |
| 9,516,053 | B1* | 12/2016 | Muddu | H04L 63/1425 |
| 2007/0100878 | A1* | 5/2007 | Fielding | G06F 21/552 |
| 2007/0168311 | A1* | 7/2007 | Genty | G06N 3/02 706/60 |
| 2010/0030884 | A1* | 2/2010 | Kiefer | H04L 41/00 709/223 |
| 2010/0049564 | A1* | 2/2010 | Lewis | G06Q 10/06 705/7.37 |
| 2010/0064367 | A1* | 3/2010 | Lysemose Hansen | G06F 21/54 726/23 |
| 2010/0107252 | A1* | 4/2010 | Mertoguno | G06F 21/55 726/23 |
| 2013/0133072 | A1* | 5/2013 | Kraitsman | H04L 63/1408 726/23 |
| 2013/0167240 | A1* | 6/2013 | Kelekar | H04L 63/1408 726/25 |
| 2013/0291106 | A1* | 10/2013 | Simonoff | G06F 21/552 726/23 |
| 2014/0013434 | A1* | 1/2014 | Ranum | H04L 63/145 726/24 |
| 2014/0095541 | A1* | 4/2014 | Herwadkar | G06F 17/30442 707/774 |
| 2014/0109223 | A1* | 4/2014 | Jin | H04L 63/1408 726/23 |
| 2014/0143869 | A1* | 5/2014 | Pereira | G06F 21/566 726/23 |
| 2016/0315822 | A1* | 10/2016 | Anderson | H04L 41/145 |
| 2017/0034035 | A1* | 2/2017 | Coleman | H04L 67/22 |
| 2017/0083704 | A1* | 3/2017 | Nie | G06F 21/552 |
| 2017/0180418 | A1* | 6/2017 | Shen | H04L 63/1416 |
| 2017/0228660 | A1* | 8/2017 | Kutzkov | G06Q 30/0251 |
| 2017/0230389 | A1* | 8/2017 | Cochenour | H04L 63/1425 |
| 2017/0237942 | A1* | 8/2017 | Arikuma | H04N 7/18 348/159 |

OTHER PUBLICATIONS

Bauer et al.; NIDX—an expert system for real-time network intrusion detection; 1988 Computer Networking Symposium (1988) Washington, DC, USA; computer.org (Year: 1988).*

Varalakshmi, Trust Management for Grid Environment, A Thesis, Faculty of Information and Communication Engineering Anna University Chennai, Apr. 2009.

Beach, et al., "Network Traffic Anomaly Detection and Characterization.", Northwestern University, Feb. 3, 2009.

* cited by examiner

METHOD FOR DETECTING REAL-TIME EVENT AND SERVER USING THE SAME

CROSS REFERENCE TO RELATED APPLICATIONS

This application is a U.S. National Phase Application of International Application No. PCT/KR2016/013046 filed on Nov. 11, 2016, which claims the benefit of priority from Korean Patent Application 10-2016-0051093 filed on Apr. 26, 2016. The disclosures of International Application No. PCT/KR2016/013046 and Korean Patent Application 10-2016-0051093 are incorporated herein by reference.

FIELD OF THE INVENTION

The present invention relates to a method for detecting a preset type of a real-time event and a server for performing the method, and more particularly, to the method for (a) loading or supporting other server to load a detection policy and (b) detecting or supporting other server to detect an event in real-time from multiple input data according to the detection policy and the server using the method.

BACKGROUND OF THE INVENTION

Thanks to the development of a network such as the Internet and wireless communication technology, wired and wireless communications continue to be increasingly used.

Recently, however, new problems such as frequently occurring malicious traffic attempts, e.g., denial-of-service (DOS) attacks on the networks, are on the rise. A denial-of-service attack refers to a type of malicious attack to make a machine connected to the network or its resource unavailable for the originally intended use by disrupting its services. There may be various means, motivations, and targets but such attacks may generally cause websites or services to be temporarily or indefinitely disrupted or suspended. Furthermore, as even Distributed DoS (DDoS) attacks capable of making services unavailable by distributively placing several computers for simultaneous attacks occur frequently, it is necessary to be prepared for such attacks.

To detect events of such attacks or abnormal behaviors and protect systems from them, a variety of methods were applied to conventional log collecting and analyzing systems. It is important for the log collecting and analyzing systems to detect events rapidly and give notice to users (real-timeness) but it is also important for them to accurately detect and give notice (accuracy). Therefore, trade-offs are made.

In other words, in the past, for real-timeness, logs are distributed to a module with multiple clustered nodes. In this case, it could be difficult to find desired events accurately because events are detected by typically and simply matching character strings or simply applying a threshold (i.e., if the amount of the same kind of logs exceeding the threshold are generated, the logs are determined as events). In addition, this method may cause a difficulty in control due to the same type of events being continuously generated. For example, if tens or hundreds of events regarding the same attack behavior for more than 1,000 times are individually notified, controlling users would feel difficulty in identifying the attack behavior.

In contrast, for accuracy, conventionally, log data is saved in a batch in non-temporary storage media (e.g., a disk drive) and searched (a batch process), in which case, fast detection of an event may be difficult as the process causes a structural delay in a typical manner. Accordingly, an event detection technique which has accuracy together with real-timeness is required.

The inventor intends to propose a method for detecting an event by using seven event detection options to detect an event effectively and efficiently as a method for detecting an event from a memory, instead of storing log data in non-temporary storage media (such as a disk) when a cluster node that handles log data initially receives the log data and searching for them, and a system using the method.

SUMMARY OF THE INVENTION

It is an object of the present invention to solve aforementioned problems.

More specifically, it is an object of the present invention to detect an event rapidly by storing log data in temporary storage media such as a memory and referring to them without recording log data in non-temporary storage media such as a disk.

It is another object of the present invention to detect an event accurately by providing an improved option other than simply matching a character string or simply applying a threshold while detecting the event using a distributed cluster module.

It is still another object of the present invention to prevent redundant detection of events while allowing a cluster module used to detect an event to be flexibly expanded.

In accordance with one aspect of the present invention, there is provided a method for detecting a preset type of real-time events, including steps of: (a) a server loading or supporting other server to load a detection policy; and (b) the server detecting or supporting other server to detect an event in real-time from multiple input data, by referring to the detection policy.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
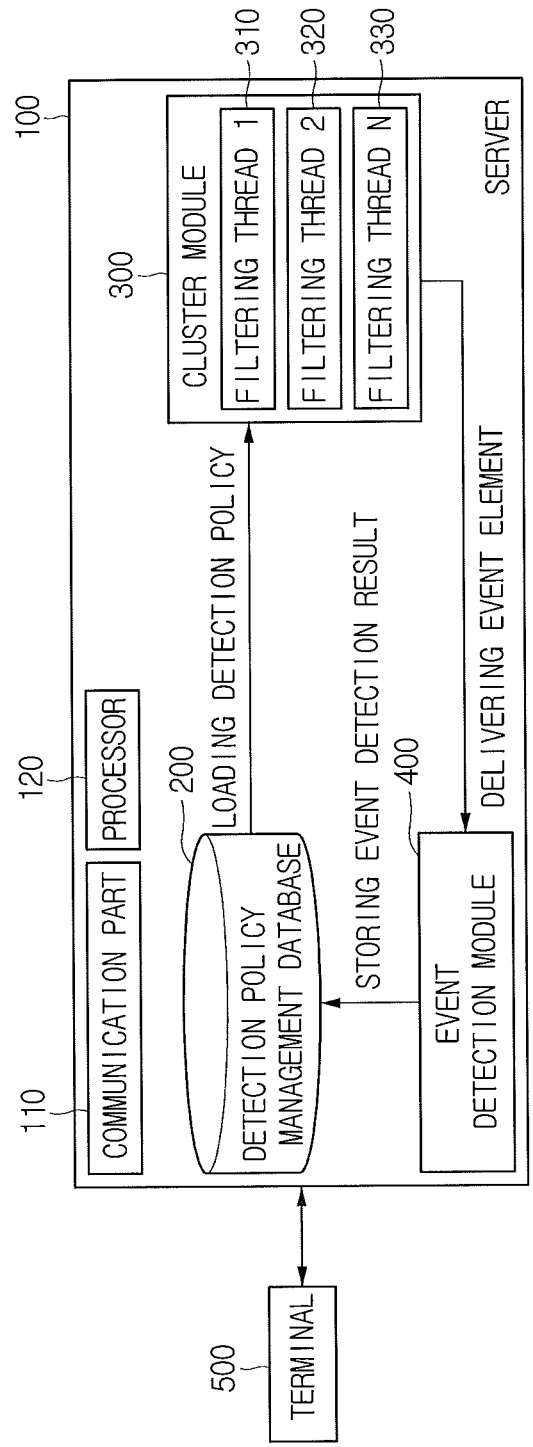
FIG. 1 is a concept diagram illustrating an exemplary configuration to apply a method for detecting a real-time event in accordance with one example embodiment of the present invention.

To make the objects of the present invention, technical solutions and benefits clear, detailed description of embodiments in which the invention may be practiced will be discussed by referring to attached drawings. These embodiments are described in sufficient detail to enable those skilled in the art to practice the invention.

Besides, in the detailed description and claims of the present invention, a term "include" and its variations are not intended to exclude other technical features, additions, components or steps. Other objects, benefits and features of the present invention will be revealed partially from the specification and partially from the implementation of the present invention. The following examples and drawings will be provided as examples but they are not intended to limit the present invention:

It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Unless otherwise indicated in the specification or clearly contradicted in the context, an item indicated in the singular includes those in the plural, unless otherwise required in the context. These embodiments will be described in sufficient detail by referring to attached drawings regarding the embodiments of the present invention to enable those skilled in the art to practice the invention.

FIG. 1 is a concept diagram roughly illustrating a server 100 and its required components, i.e., a communication part 110 and a processor 120, a detection policy management database 200, a cluster module 300, an event detection module 400, and a terminal 500 for providing user interface (UI) connected to the server 100, as an exemplary configuration to apply a method for detecting a real-time event in accordance with one example embodiment of the present invention.

By referring to FIG. 1, it is illustrated that the server 100 includes the detection policy management database 200. In accordance with another example embodiment, the detection policy management database 200 may be also implemented in an apparatus independent from the server 100, in which case, the server 100 may connect to the detection policy management database 200 through a wired or a wireless connection by using the communication part 110.

In the detection policy management database 200, a detection policy management table may be provided, and data regarding a detection policy may be held in the detection policy management table. If there is a request for enquiring a detection policy, the detection policy management database 200 which retains the detection policy may deliver the detection policy in response to the query.

In addition, FIG. 1 illustrates that the server 100 includes the cluster module 300. In accordance with another example embodiment, the cluster module 300 may be also implemented in an apparatus independent from the server 100, in which case, the server 100 may connect to the cluster module 300 through the a wired or a wireless connection by using the communication part 110.

The cluster module 300 may include multiple cluster nodes which are clustered and primarily recognize data corresponding to at least one detection rule set query which is at least one rule for detecting at least one event element expressed as at least one query. To perform the function, filtering threads are implemented on the cluster nodes. Detailed explanation on the function will be made later.

Besides, FIG. 1 shows that the server 100 includes the event detection module 400. In accordance with another example embodiment, the event detection module 400 may be also implemented in an apparatus independent from the server 100, in which case, the server 100 may connect to the event detection module 400 through the a wired or a wireless connection by using the communication part 110.

The event detection module 400 has a function of detecting events, i.e., determining an event among event elements, according to seven detection options in accordance with the present invention by collecting the event elements primarily acquired from the cluster module 300 in a memory, wherein the event elements serve as basic data for determining whether to detect an event. The event detection module 400 may deliver the detected event to the detection policy management database 200.

The detection policy management database 200, the cluster module 300, and the event detection module 400 as explained above, perform functions of connecting with each other, regardless of whether they are included in the server 100 or they are configured as apparatuses independent from the server 100, and detecting an event.

By referring to FIG. 1, the terminal 500 is illustrated. The detection policy defined by a user could be acquired from the terminal 500, which is not a required component in the present invention.

For example, the terminal 500 may be a wireless network client, a desktop computer, a laptop, a mobile device, a mobile phone, a PDA, and any other terminal, but it will be understood by those skilled in the art that it is not limited to these. In the terminal 500, a UI-based user interface module which can register, edit, and delete a detection policy of an event is implemented. A detection rule set query, detection options, a reference time used in the algorithm of individual detection options, a threshold, a unique field, a unique field threshold, etc. may be set by the user interface module. If such settings are changed in accordance with one example embodiment, a changed detection policy may be held in the detection policy management database 200 and may be notified to at least one of the cluster module 300 and the event detection module 400.

In addition, the server 100 in FIG. 1 includes the communication part 110 and the processor 120, which perform essential functions when they perform the method for detecting a real-time event in accordance with the present invention.

More specifically, the communication part 110 and the processor 120 may load or support other server to load a detection policy under the method for detecting a real-time event in accordance with the present invention. In accordance with one example embodiment, the communication part 110 may also support the cluster module 300 including at least one filtering thread to load the detection policy.

Furthermore, the processor 120 may perform the method for detecting or supporting other server to detect a real-time event from multiple input data according to the detection policy acquired through the communication part 110 in accordance with the present invention.

The method for detecting a real-time event in accordance with the present invention that is performed by the server 100 will be explained in more details.

Figure 2:
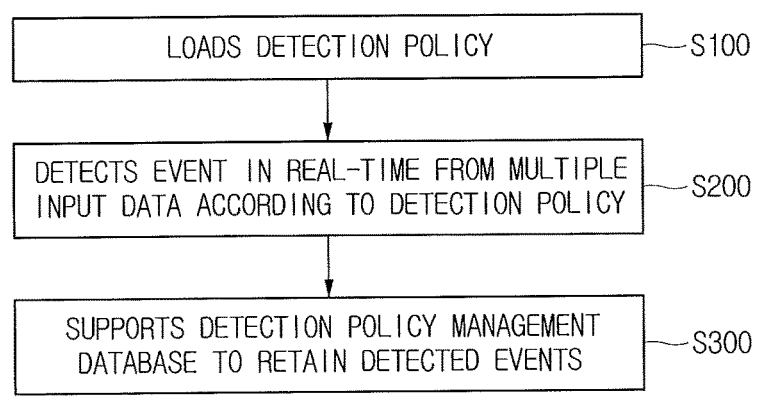
FIG. 2 is a flowchart exemplarily showing a method for detecting a real-time event in accordance with one example embodiment of the present invention.

FIG. 2 is a flowchart exemplarily representing the method for detecting a real-time event in accordance with one example embodiment of the present invention.

By referring to FIG. 2, the method for detecting a real-time event in accordance with the present invention includes a step S100 of the server 100 loading or supporting other server to load the detection policy.

A detection policy means a rule specifying which event should be detected and may include a detection rule set query which expresses a rule for detecting each event element, i.e., an element composing an event, as a query, detection options which mean individual algorithms used to detect an event, a reference time used for the individual algorithms according to individual detection options, a threshold, a unique field, a unique field threshold, etc. but it is not limited to these.

As one example, at the step S100, the server 100 may support the cluster module 300 to load the detection policy and the cluster module 300 includes at least one filtering thread. As the case may be, on condition that a request to apply a change of the detection policy is detected, the server 100 may support the cluster module 300 to load the detection policy. For example, the request to apply the change of the detection policy may be acquired from the terminal 500 connected to the server 100 or from the detection policy management database 200 that acquires a new detection policy from the terminal 500, etc.

More preferably, at the step S100, the server 100 may further perform or support other server to perform a process of deciding an integrity of the loaded detection policy by using input data for verification. The input data for verification may be a fixed set prepared in advance or dummy data prepared by a separate process of creating data for verification.

By referring to FIG. 2 again, the method for detecting a real-time event in accordance with the present invention further includes a step S200 of the server 100 detecting or supporting other server to detect an event in real-time from multiple input data according to the detection policy. Herein, input data refer to log data, etc. as targets from which an event is to be detected. The input data may include at least either of text data or binary data. The input data may be acquired by the server 100 through its communication part 110 or by the cluster module 300 connected to the server.

As an example, at the step S200, the server 100 may support individual filtering threads included in the cluster module 300 to detect an event element from multiple input data according to a detection policy and, as another example, may support the event detection module 400 to detect an event from information on the detected event element according to the detection policy. As the case may be, on condition that a request to apply a change of the detection policy is recognized, the server 100 may support the event detection module 400 to acquire the detection policy, and therefore, support the event detection module 400 to detect an event according to the detection policy as well. Just as stated above, the request to apply the change of the detection policy may be acquired from the terminal 500 connected to the server 100 or the detection policy management database 200 that acquires a new detection policy from the terminal 500, etc.

Besides, at the step S200, if the detection policy includes a detection rule set query, the server 100 may determine or support other server to determine input data satisfying the detection rule set query among the multiple input data as an event element.

In addition, at the step S200, if the detection policy includes a unique field and a unique field threshold x, the server 100 may filter or support other server to filter x or less input data whose unique field values are same with one another as one piece of input data and if the detection policy includes only a unique field without any unique field threshold, the server 100 may filter or support other server to filter input data whose unique field has the same values as one piece of input data. The role of the unique field and the unique field threshold is to detect an event more effectively by reducing the number of event elements as targets from which events are determined.

More specifically, at the step S200, the method for detecting an event in real-time by recognizing individual event elements in real-time from multiple input data may be in accordance with at least seven detection options that may be included in the detection policy.

First Detection Option

The detection according to a first algorithm corresponding to a first detection option includes: a step S211 (not illustrated) of the server 100, if an event element is firstly recognized to be generated, performing or supporting other server to perform processes of determining a firstly recognized event element as a detected event and of setting the firstly recognized event element as a reference event element; and a step S212 (not illustrated) of the server 100, if another event element is recognized to be generated before a lapse of a reference time from a time of generation of the event element, performing or supporting other server to perform processes of not determining the another event element as a detected event and of setting the another event element as the newly updated reference event element and, if another event element is recognized to be generated after a lapse of the reference time from the time of the generation of the reference event element, performing or supporting other server to perform processes of determining the another event element as a detected event and of setting the another event element as the newly updated reference event element.

Figure 3:
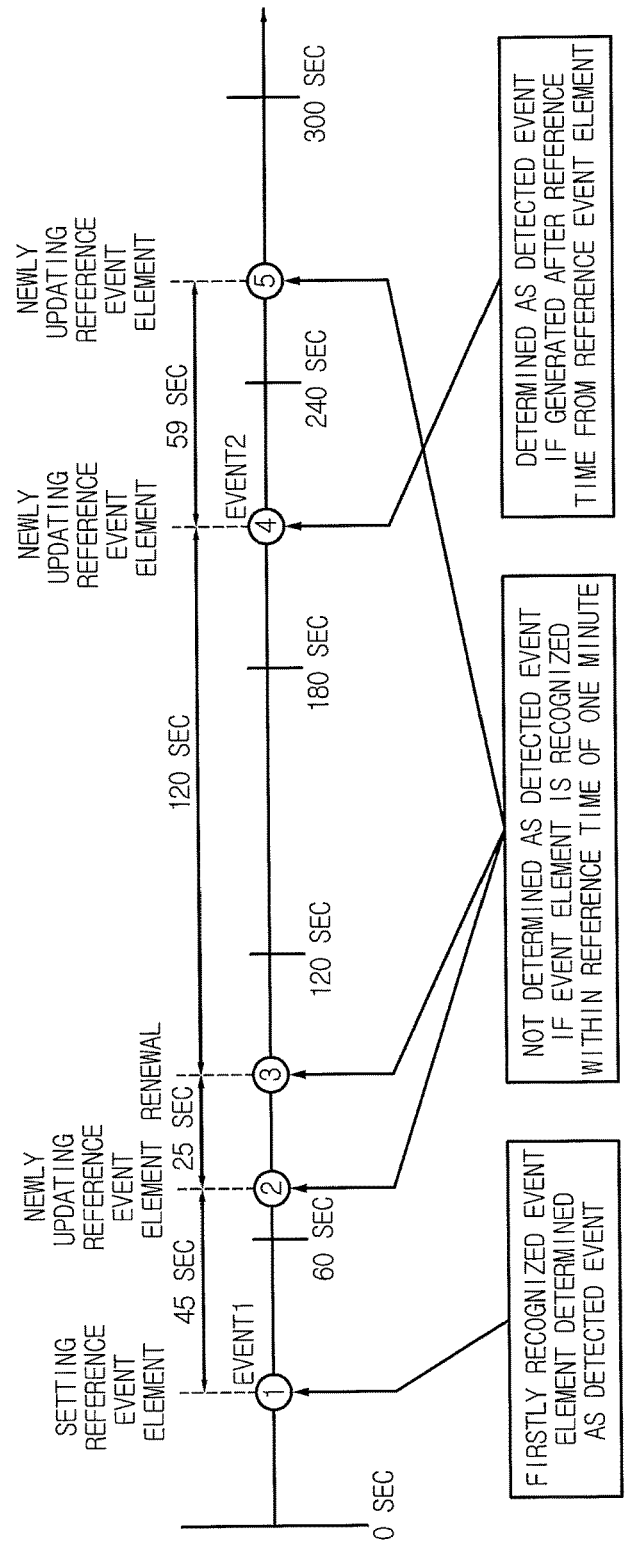
FIG. 3 is a drawing specifically exemplifying a technique according to a first detection option of a method for detecting a real-time event in accordance with one example embodiment of the present invention.

FIG. 3 is a drawing exemplifying detection of an event according to the first detection option as a timeline. In the example drawing, a reference time is assumed to be one minute and numbers in circles refer to numbers of event elements. If a time of starting detection in FIG. 3 is 0 second, a first event element, i.e., an event element 1, is determined as a detected event. The first event element is set as a reference event element, which is an event element corresponding to a reference time to determine whether an event is generated. As an event element 2 is generated before a lapse of the reference time from the first reference event element, the event element is not determined as an event and the event element 2 is updated as a new reference event element. As an event element 3 is generated before a lapse of the reference time from the event element 2 as the reference event element, the event element 3 is not determined as an event and the reference event element is newly updated as the event element 3. Next, as an event element 4 is generated after a lapse of the reference time from the event element 3 as the reference event element, the event element 4 is determined as an event and the reference event element is also newly updated as the event element 4. An event element 5 is not determined as an event just as explained in the events 2 and 3. As a result, only the event elements 1 and 4 among the event elements 1 to 5 are determined as detected events.

Second Detection Option

Next, the detection according to a second algorithm corresponding to a second detection option includes: a step S221 (not illustrated) of the server 100, if an event element is firstly recognized to be generated, performing or supporting other server to perform processes of not determining a firstly recognized event element as a detected event and of setting the firstly recognized event element as a reference event element; and a step S222 (not illustrated) of the server 100, if another event element is recognized to be generated before a lapse of a reference time from a time of generation of the event element, performing or supporting other server to perform processes of determining the another event element as a detected event and of setting the another event element as the newly updated reference event element and, if another event element is recognized to be generated after a lapse of the reference time from the time of the generation of the reference event element, performing or supporting other server to perform processes of not determining the another event element as a detected event and of setting the another event element as the newly updated reference event element.

Figure 4:
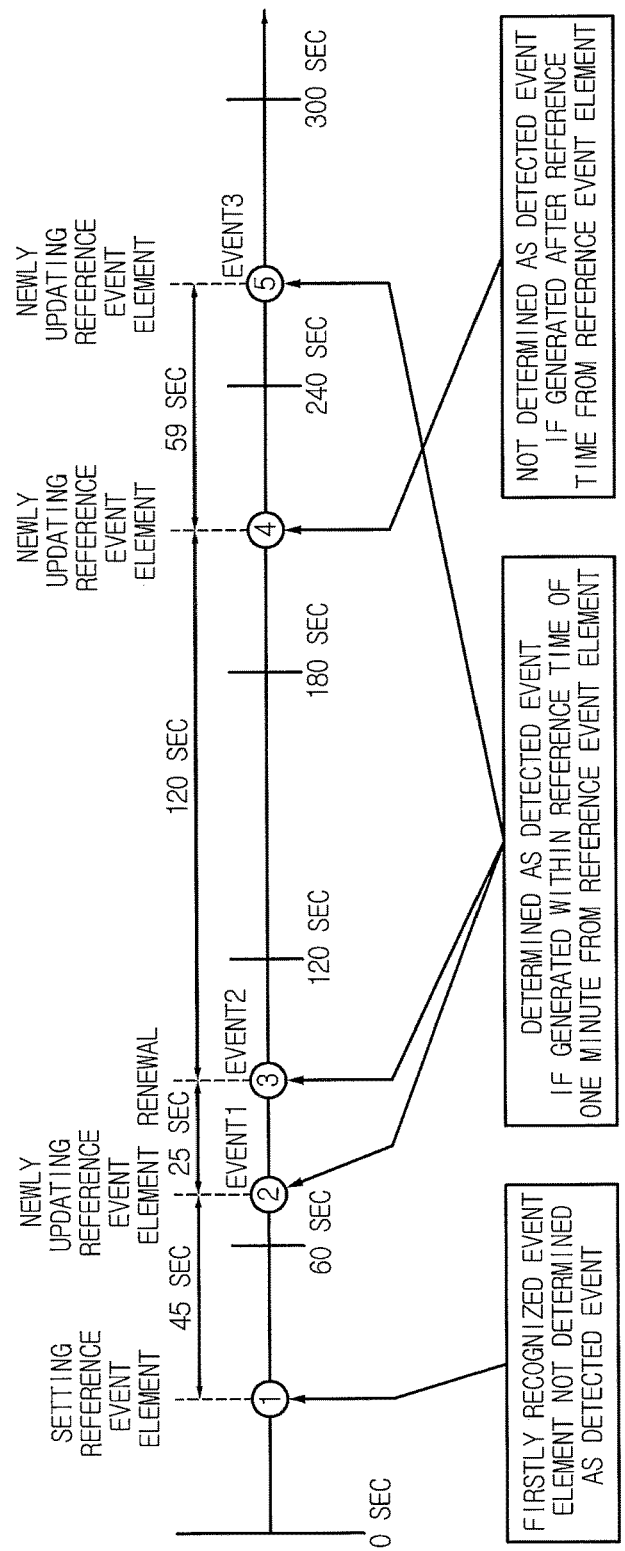
FIG. 4 is a drawing specifically exemplifying a technique according to a second detection option of a method for detecting a real-time event in accordance with one example embodiment of the present invention.

FIG. 4 is a drawing exemplifying detection of an event according to the second detection option as a timeline. As before, in the FIG. 4, a reference time is assumed to be one minute. If a time of starting detection in FIG. 4 is 0 second, a first event element, i.e., an event element 1, is not determined as an event. Herein, the first event element is set as a reference event element. As an event element 2 is generated before a lapse of the reference time from the first reference event element, the event element 2 is determined as an event and is updated as a new reference event element. As even an event element 3 is generated before a lapse of the reference time from the event element 2 as the reference event element, the event element 3 is determined as an event and the reference event element is also newly updated. Next, as an event element 4 is generated after a lapse of the reference time from the event element 3 as the reference event element, the event element 4 is not determined as an event and the reference event element is also newly updated as the event element 4. An event element 5 is determined as an event just as shown in the events 2 and 3. As a result, only the event elements 2, 3, and 5 among the event elements 1 to 5 are determined as detected events.

Third Detection Option

As a next example, the detection according to a third algorithm corresponding to a third detection option includes: a step S231 (not illustrated) of the server 100, if an event element is recognized to be generated, determining or supporting other server to determine the recognized event element as a detected event.

Figure 5:
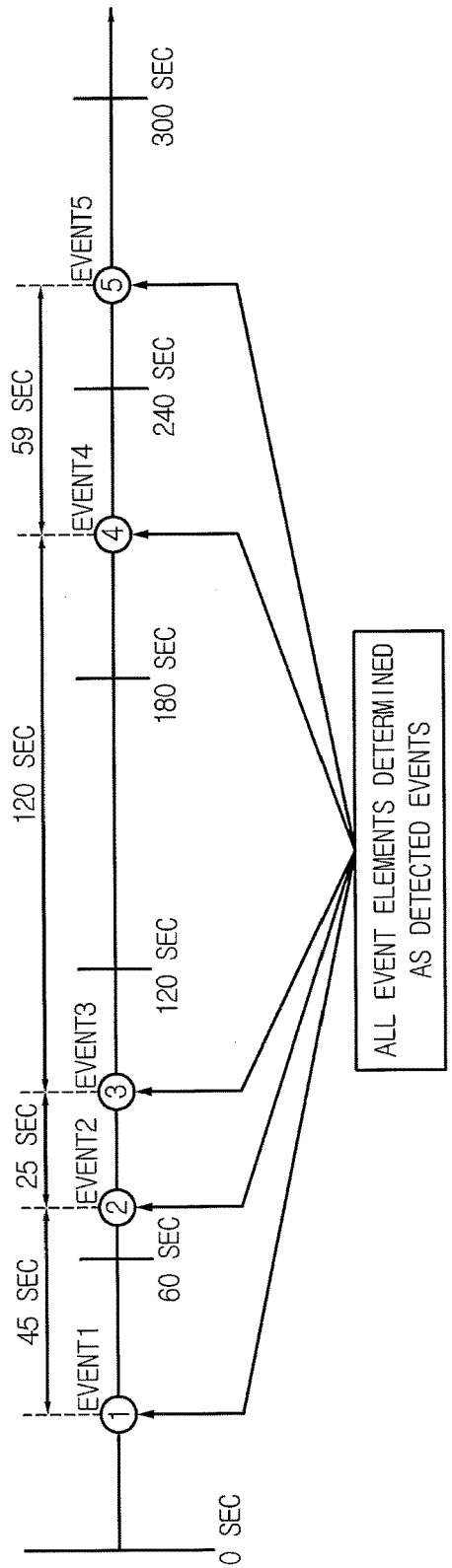
FIG. 5 is, a drawing specifically exemplifying a technique according to a third detection option of a method for detecting a real-time event in accordance with one example embodiment of the present invention.

FIG. 5 is a drawing exemplifying detection of an event according to the third detection option as a timeline. If a time of starting detection in FIG. 5 is 0 second, all event elements are determined as detected events. No event elements are ignored. That is, regardless of a threshold or a reference time, it is determined that all events are generated whenever all event elements are recognized.

Fourth Detection Option

In addition, the detection according to a fourth algorithm corresponding to a fourth detection option includes: a step S241 of the server 100, if consecutive n event elements are firstly recognized to be generated within a reference time, performing or supporting other server to perform processes of determining a predefined m-th event element among the firstly recognized n event elements as a detected event and of setting the m-th event element as a reference event element; and a step S242 of the server 100, if consecutive n other event elements are recognized to be generated after a time of generation of the reference event element and all the recognized n other event elements are generated before a lapse of the reference time from the time of the generation of the reference event element, performing or supporting other server to perform processes of not determining the recognized n other event elements as detected events and of setting an m-th event element among the recognized n other event elements as the newly updated reference event element and, if consecutive n other event elements are recognized to be generated after the time of the generation of the reference event element and at least one of the recognized n other event elements is generated after a lapse of the reference time from the time of the generation of the reference event element, performing or supporting other server to perform processes of determining an m-th event element among the recognized n other event elements as a detected event and of determining the m-th event element among the recognized n other event elements as the newly updated reference event element.

Figure 6:
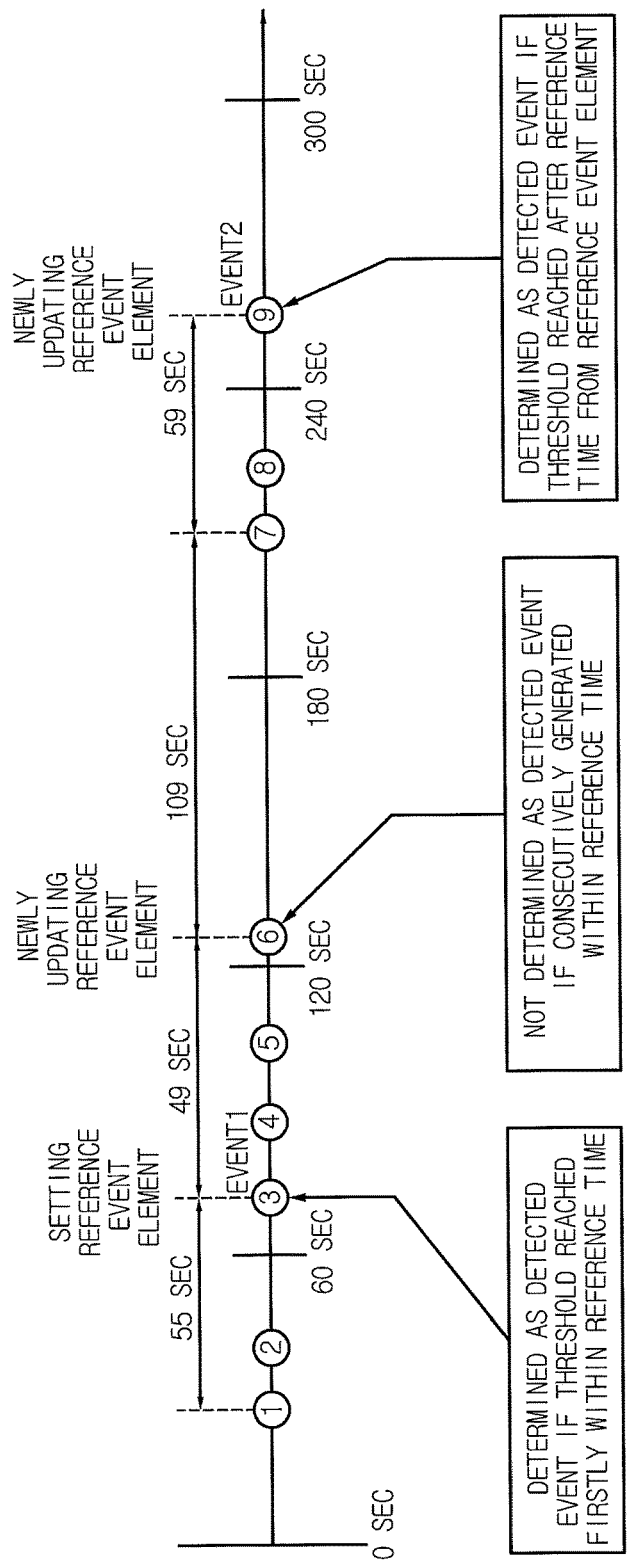
FIG. 6 is a drawing specifically exemplifying a technique according to a fourth detection option of a method for detecting a real-time event in accordance with one example embodiment of the present invention.

FIG. 6 is a drawing exemplifying detection of an event according to the fourth detection option as a timeline. In this example drawing, it is assumed that a reference time is one minute; a threshold is 3; and m is 3. Typically, m would be an integer greater than zero but less than or equal to n, but it is not limited to this.

If a time of starting the detection in FIG. 6 is 0 second, a third event element, i.e., an event element 3, among the first three event elements consecutively generated within the reference time is determined as a detected event. The event element 3 is set as a reference event element. Then, as three event elements, i.e., event elements 4, 5, and 6, consecutively generated after the reference event element was generated are recognized and all are generated within the reference time from the reference event element, the event elements 4, 5, and 6 are not determined as detected events and the event element 6 is updated as a new reference event element. Thereafter, as three event elements, i.e., event elements 7, 8, and 9, consecutively generated after the new reference event element was generated are recognized and at least one (all in this case) of the three event elements is generated within the reference time after a lapse of the reference time from the reference event element, the third event element 9 among the three event elements 7, 8, and 9 is determined as an event and the reference event element is newly updated as the event element 9. As a result, only the event elements 3 and 9 among the event elements 1 to 9 are determined as detected events.

Fifth Detection Option

Next, the detection according to a fifth algorithm corresponding to a fifth detection option includes: a step S251 of the server 100, if consecutive n event elements are firstly recognized to be generated within a reference time, performing or supporting other server to perform processes of not determining the firstly recognized n event elements as detected events and of setting an m-th event element among the firstly recognized n event elements as a reference event element; and a step S252 of the server 100, if consecutive n other event elements are recognized to be generated after a time of generation of the reference event element and all the recognized n other event elements are generated before a lapse of the reference time from the time of the generation of the reference event element, performing or supporting other server to perform processes of determining an m-th event element among the recognized n other event elements as a detected event and of determining the m-th event element among the recognized n other event elements as the newly updated reference event element and, if the consecutive n other event elements are recognized to be generated after the time of the generation of the reference event element and at least one of the recognized n other event elements is generated after a lapse of the reference time from the time of the generation of the reference event element, performing or supporting other server to perform processes of not determining the recognized n other event elements as detected events and of setting an m-th event element among the recognized n other event elements as the newly updated reference event element.

Figure 7:
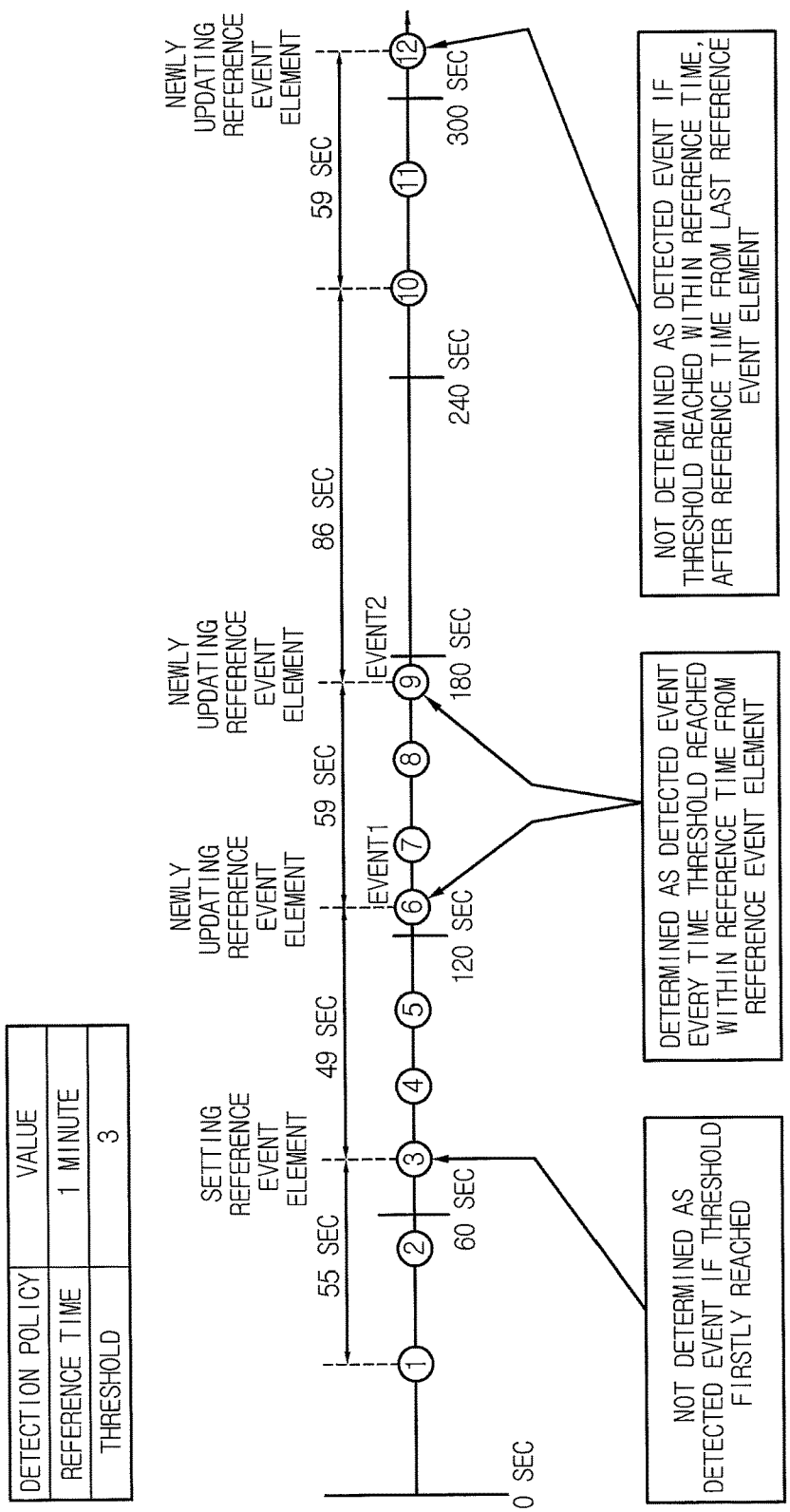
FIG. 7 is a drawing specifically exemplifying a technique according to a fifth detection option of a method for detecting a real-time event in accordance with one example embodiment of the present invention.

FIG. 7 is a drawing exemplifying detection of an event according to the fifth detection option as a timeline. As before, in the FIG. 7, it is assumed that a reference time is one minute; a threshold is 3; and m is 3. If a time of starting detection in FIG. 7 is 0 second, the first three event elements consecutively generated within the reference time are not determined as detected events. Among them, an event element 3 as an m-th event element is set as a reference event element.

Then, as three event elements, i.e., event elements 4, 5, and 6, consecutively generated after the reference event element was generated are recognized and all are generated within the reference time from the reference event element, the third event element 6 among the event elements 4, 5, and 6 is determined as an event and it is updated as a new reference event element. Thereafter, as three event elements, i.e., event elements 7, 8, and 9, consecutively generated after the new reference event element was generated are recognized and all are generated within the reference time from the reference event element, the third event element 9 among the event elements 7, 8, and 9 is determined as an event and it is updated as a new reference event element. Then, as all the three event elements, i.e., event, elements 10, 11, and 12, consecutively generated after the new reference event element was generated are within the reference time, but at least one (all in this case) of the three event elements is generated after a lapse of the reference time from the updated reference event element, the three event elements are not determined as events and the reference event element is newly updated as the event element 12. As a result, only the event elements 6 and 9 in FIG. 7 are determined as detected events.

Sixth Detection Option

Besides, the detection according to a sixth algorithm corresponding to a sixth detection option includes: a step S261 of the server 100, if consecutive n event elements are firstly recognized to be generated within a reference time, performing or supporting other server to perform processes of determining a predefined m-th event element among the firstly recognized n event elements as a detected event and of setting an n-th event element thereamong as a reference event element; and a step S262 of the server 100, if consecutive n other event elements are recognized to be generated after a time of generation of the reference event element and all the recognized consecutive n other event elements are generated after the time of the generation of the reference event element and a difference between the first event element and the n-th event element among the consecutive n other event elements is shorter than the reference time, performing or supporting other server to perform processes of determining an m-th event element among the consecutive n other event elements as a detected event and of setting the n-th event element among the consecutive n other event elements as the reference event element.

Figure 8:
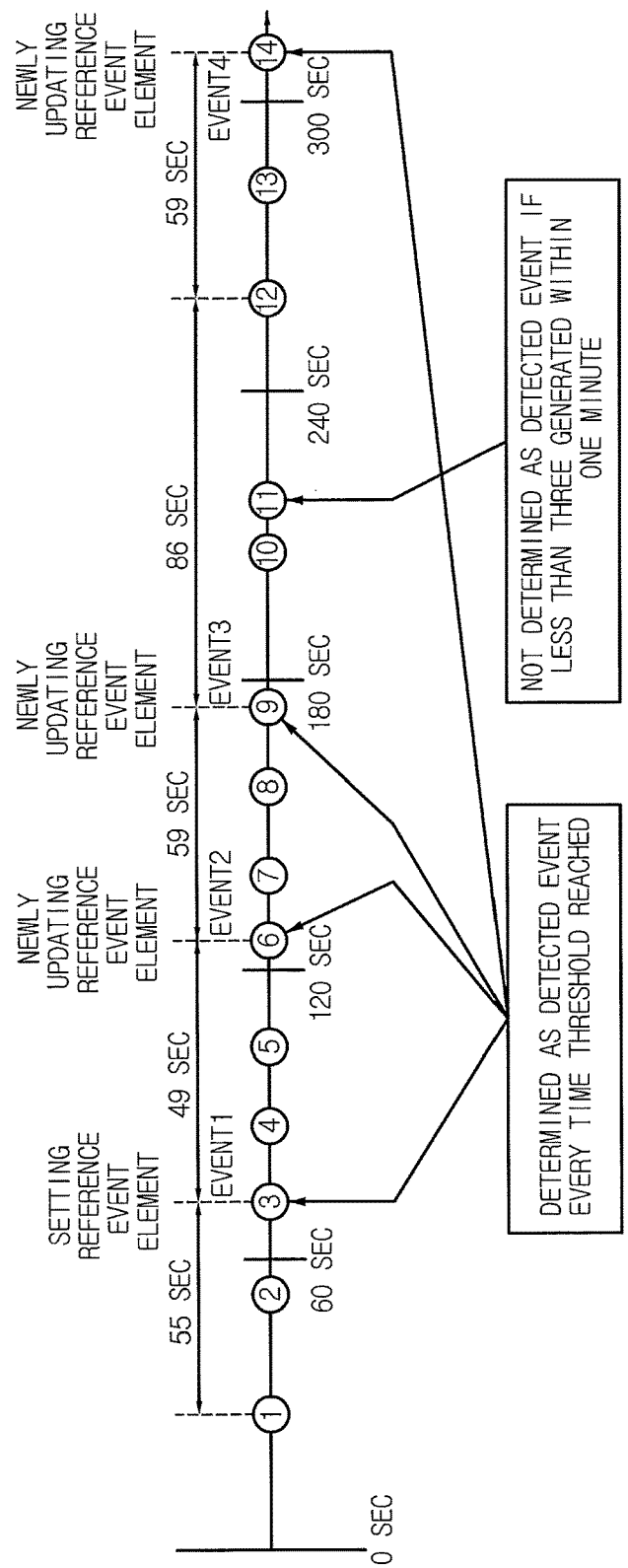
FIG. 8 is a drawing specifically exemplifying a technique according to a sixth detection option of a method for detecting a real-time event in accordance with one example embodiment of the present invention.

FIG. 8 is a drawing exemplifying detection of an event according to the sixth detection option as a timeline. As before, in the FIG. 8, it is assumed that a reference time is one minute; a threshold is 3; and m is 3. If a time of starting detection in FIG. 8 is 0 second, a third event element 3 among the first three event elements consecutively generated within the reference time is determined as a detected event. The event element 3 is set as a reference event element. An event element 4 as another event element after the reference event element was generated is recognized and since all three consecutive event elements 2, 3, and 4 with the event element 4 as a third event element are not generated after the time of the generation of the event element 3 as a reference element, the event element 4 is not determined as a detected event. Next, as an event element 5, another event element, is recognized but all three consecutive event elements 3, 4, and 5 with the event element 5 as a third event element are not generated after the time of the generation of the event element 3, the event element 5 is not determined as a detected event. Next, as an event element 6, another event element, is recognized and all three consecutive element events, i.e., event elements 4, 5, and 6, with the event element 6 as a third event element are generated after the time of the generation, of the event element 3 as the reference event element and the difference of the time of the generation between the event element 4 as the first one and the event element 6 as the third one is less than 49 seconds which is shorter than one minute as the reference time, the event element 6 as the third one among the three consecutive event elements is determined as a detected event and the event element 6 is newly updated as a reference event element. As such, the above-described processes are repeated and an event element 9 is also determined as a detected event and updated as a new reference event. Likewise, event elements 10, 11 and 12 are ignored. But an event element 14 is determined as a detected element because all event elements 12, 13, and 14 are generated after the time of the generation of the event element 9 as a reference event element and all of them are within one minute as the reference time. Herein, the reference event element is newly updated as the event element 14. As a result, only the event elements 3, 6, and 14 among the event elements 1 to 14 are determined as detected events.

Seventh Detection Option

As a last example, the detection according to a seventh algorithm corresponding to a seventh detection option includes: a step S271 of the server 100 setting or supporting other server to set a starting time t0 of detection, at which time the detection starts, as a starting time t of schedule; and a step S272 of the server 100, upon a lapse of a reference time p from the starting time t of schedule, if at least n event elements are recognized to be generated during a time from t to t+p, performing or supporting other server to perform processes of determining a predefined m-th event element among the at least n detected event elements as a detected event or time t+p as an event generation time, and of setting t+p as a new starting time t of schedule and, if no n event elements are recognized to be generated during the time from t to t+p, determining that no event is detected during the time from t to t+p and setting or supporting other server to set t+p as a new starting time t of schedule.

Figure 9:
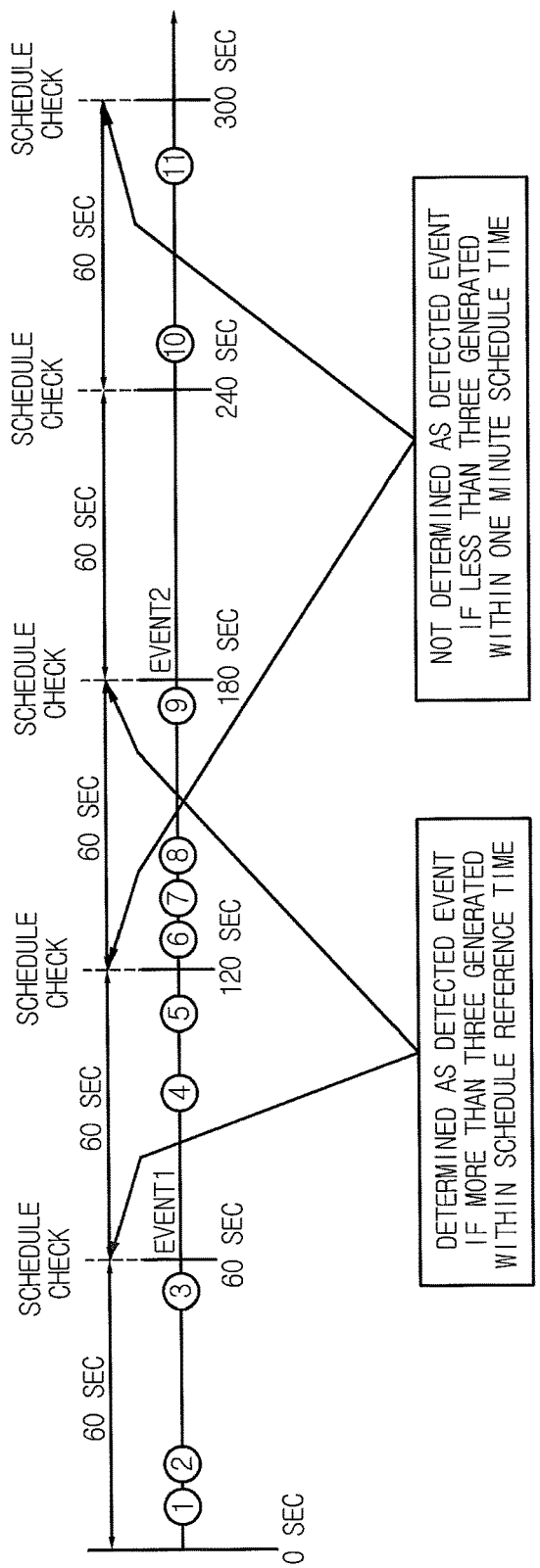
FIG. 9 is a drawing specifically exemplifying a technique according to a seventh detection option of a method for detecting a real-time event in accordance with one example embodiment of the present invention.

FIG. 9 is a drawing exemplifying detection of an event according to the seventh detection option as a timeline. As before, in the FIG. 9, it is assumed that a reference time p for a schedule is one minute; a threshold is 3; and m is 3. If a time of starting detection in FIG. 9 is t=t0, i.e., 0 second, at least one of the first three event elements consecutively generated during a time from t and t+p, i.e., for 60 seconds, is determined as a detected event or the time of t+p=60 seconds is determined as an event generation time. The point of time at 60 seconds is set as a new starting time t of schedule. After that, three event elements are not generated during the time between t and t+p which means a time corresponding to 120 seconds, it is determined that there is no event detected during the time from t to t+p. When the above-described processes are repeated, at least one event element among event elements 6, 7, 8, and 9 is determined as a detected event or the point of time at 180 seconds is determined as an event generation time and the point time of at 180 seconds is newly updated as a starting time t of schedule. As no event element is generated during the time interval between 180 seconds and 240 seconds, it is determined that no event is detected and as less than three event elements are generated during the time interval between 240 seconds and 300 seconds, it is also determined that no event is detected. As a result, it is determined that events are generated only during the time between 0 second and 60 seconds and between 120 seconds and 180 seconds.

As such, it could be understood by those skilled in the art that the seven detection options capable of detecting events from the event elements recognized in real-time at the step S200 would be, solely or in combination, used with another detection option.

By referring to FIG. 2 again, the method for detecting a real-time event in accordance with the present invention may further include a step S300 of the server 100 supporting the detection policy management database 200 to retain the detected events. However, this is not an essential matter and there would be a variety of variants in indicating and/or retaining the detected event.

The present invention has an effect of detecting accurately an event as a target for detection in a cluster structure in almost close to real-time without redundancy by handling data in a memory through all example embodiments.

The benefits of the technology explained in the example embodiments are that a cluster node of a cluster module much loaded with input data may be expanded without limit and that efficiency of control may increase by filtering redundant events via applying, combining and modifying various detection policies.

In accordance with the present invention, there is an effect of detecting an event almost close to the real-time in a cluster structure by handling data in a memory without storing data in non-temporary storage media.

In accordance with the present invention, there are effects of expanding cluster nodes of a cluster module to which much load is charged depending on amount of input data limitlessly and increasing control effectively by flexibly applying, combining and changing a variety of detection policies and filtering redundant events.

Based on explanation of the example embodiments, those skilled in the art may clearly understand that the present invention may be achieved with a combination of software and hardware or only with hardware. The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case. The hardware device may include a processor such as CPU or GPU configured to be combined with a memory such as ROM or RAM to store program commands and run the commands stored in the memory and a communication part for transmitting and receiving signals to/from external devices. In addition, the hardware device may include a keyboard, a mouse, or other external input apparatus to receive commands prepared by developers.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variants equal or equivalent to the patent claims pertain to the category of the thought of the present invention.

What is claimed is:

1. A method for detecting a preset type of real-time events, comprising steps of:
    (a) loading, by a first server, a detection policy on the first server or supporting, by the first server, a second server in loading the detection policy on the second server; and
    (b) detecting, by the first server, an event in real time from multiple input data according to the detection policy or supporting, by the first server, the second server in detecting the event in real-time from multiple input data according to the detection policy; and
    wherein, at the step of (a), the first server executes two or more cluster modules including at least one filtering thread in loading the detection policy; and
    wherein, at the step of (b), the first server executes the two or more cluster modules in recognizing an event element from the multiple input data according to the detection policy via the at least one filtering thread and executes an event detection module in detecting an event from information regarding the recognized event element according to the detection policy; and wherein, at the step of (b), the first server executing the event detection module in detecting an event from the multiple input data in real-time by referring to at least one algorithm corresponding to a detection option of the detection policy; and wherein the at least one algorithm is performed according to a reference time and a pre-set threshold n; and wherein the at least one algorithm sets an event element, which satisfies at least one certain condition, among recognized event elements as a detected event, or the at least one algorithm sets the event element as a reference event element; and wherein if the event element is set to a reference event element, the event element set to a reference event element refers to at least one of:

information on whether another event element, which is considered based on the reference event element, is recognized before or after a predetermined time has elapsed from a time of a generation of the reference event element, and information on whether the another event element is recognized before or after the predetermined time has elapsed, with the another event element recognized consecutively for a predetermined amount of time, and then at least part of the another event element has been set as another detected event.

2. The method of claim 1, further comprising a step of: (c) retaining or supporting, by the first server, the second server in retaining the detected event, wherein, at the step of (c), implementing, by the first server a detection policy management database in retaining the detected event.

3. The method of claim 2, wherein, at the step of (a), if a request to apply a change of the detection policy is recognized, executing, by the first server, the two or more cluster modules including at least one filtering thread in loading the detection policy; and wherein, at the step of (b), if the request to apply the change of the detection policy is recognized, executing, by the first server, the event detection module in acquiring the detection policy in order to allow the event detection module to detect an event from the information on the recognized event element according to the detection policy.

4. The method of claim 1, wherein, at the step of (b), if a detection option of the detection policy is additional option, detecting or supporting, by the first server, the second server in detecting an event from the multiple input data in real-time according to an additional algorithm which is determined by referring to a pre-specified reference time; and wherein the detection according to the additional algorithm includes steps of:

performing or supporting, by the first server, if an event element is recognized as generated, the second server in performing processes of determining the recognized as generated event element as a detected event and of setting the recognized as generated event element as a reference event element, and performing or supporting, by the first server, if another event element is recognized as generated before a lapse of the pre-specified reference time from the time of the generation of the reference event element, the second server in performing processes of not determining the another event element as a detected event and of setting the another event element as a newly updated reference event element and performing or supporting, by the first server, if another event element is recognized as generated after the lapse of the pre-specified reference time from the time of the generation of the reference event element, performing or supporting, by the second server, in performing processes of determining the another event element as a detected event and of setting the another event element as a newly updated reference event element.

5. The method of claim 1, wherein, at the step of (b), if a detection option of the detection policy is an additional option, detecting or supporting, by the first server, the second server in detecting an event from the multiple input data in real-time according to an additional algorithm which is determined by referring to a pre-specified reference time; and wherein the detection according to the additional algorithm includes steps of:

performing or supporting, by the first server, if an event element is recognized as generated, the second server in performing processes of not determining the recognized as generated event element as a detected event and of setting the recognized as generated event element as a reference event element, and performing or supporting, by the first server, if another event element is recognized as generated before a lapse of the pre-specified reference time from the time of the generation of the reference event element, the second server in performing processes of determining the another event element as a detected event and of setting the another event element as a newly updated reference event element and performing or supporting, by the first server, if another event element is recognized as generated after the lapse of the pre-specified reference time from the time of the generation of the reference event element, performing or supporting, by the second server, in performing processes of not determining the another event element as a detected event and of setting the another event element as a newly updated reference event element.

6. The method of claim 1, wherein, at the step of (b), if a detection option of the detection policy is an additional option, detecting or supporting, by the first server, the second server in detecting an event from the multiple input data in real-time according to an additional algorithm; and wherein the detection according to the additional algorithm includes a step of:

determining or supporting, by the first server, if an event element is recognized to be generated, the second server in determining the recognized event element as a detected event.

7. The method of claim 1, wherein, at the step of (b), if a detection option of the detection policy is an additional option, detecting or supporting, by the first server, the second server in detecting an event in real-time from the multiple input data according to an additional algorithm which is determined by referring to a pre-specified reference time and the preset threshold n; and wherein the detection according to the additional algorithm includes steps of:

performing or supporting, by the first server, if consecutive n event elements are recognized as generated within the pre-specified reference time, the second server in performing processes of determining a pre-defined m-th event element among the firstly recognized n event elements as a detected event and of setting the m-th event element as a reference event element, and performing or supporting, by the first server, if consecutive n other event elements are recognized as generated after a time of the generation of the reference event element and all the recognized n other event elements are generated before a lapse of the pre-specified reference time from the time of the generation of the reference event element, the second server in performing processes of not determining the recognized n other event elements as detected events and of setting an m-th event element among the recognized n other event elements as a newly updated reference event element and performing or supporting, by the first server, else if consecutive n other event elements are recognized as generated after the time of the generation of the reference event element and at least one of the recognized n other event elements is generated after the lapse of the pre-specified reference time from the time of the generation of the reference event element, performing or supporting, by the second server, in performing processes of determining an m-th event element among the recognized n other event elements as a detected event and of determining the m-th event element among the recognized n other event elements as a newly updated reference event element.

8. The method of claim 1, wherein, at the step of (b), if a detection option of the detection policy is an additional option, detecting or supporting, by the first server, the second server in detecting an event in real-time from the multiple input data according to an additional algorithm which is determined by referring to a pre-specified reference time and the preset threshold n; and wherein the detection according to the additional algorithm includes steps of:

performing or supporting, by the first server, if consecutive n event elements are recognized as generated within the pre-specified reference time, the second server in performing processes of not determining the recognized as generated n event elements as detected events and of setting an m-th event element among the recognized as generated n event elements as a reference event element, and performing or supporting, by the first server, if consecutive n other event elements are recognized as generated after the time of the generation of the reference event element and all the recognized n other event elements are generated before a lapse of the pre-specified reference time from the time of the generation of the reference event element, the second server in performing processes of determining an m-th event element among the recognized n other event elements as a detected event and of determining the m-th event element among the recognized n other event elements as a newly updated reference event element and performing or supporting, by the first server, if consecutive n other event elements are recognized to be generated after the time of the generation of the reference event element and at least one of the recognized n other event elements is generated after the lapse of the pre-specified reference time from the time of the generation of the reference event element, performing or supporting, by the second server, in performing processes of not determining the recognized n other event elements as detected events and of setting an m-th event element among the recognized n other event elements as a newly updated reference event element.

9. The method of claim 1, wherein, at the step of (b), if a detection option of the detection policy is a an additional option, detecting or supporting, by the first server, the second server in detecting an event in real-time from the multiple input data according to a an additional algorithm which is determined by referring to a pre-specified reference time and the preset threshold n; and wherein the detection according to the additional algorithm includes steps of:

performing or supporting, by the first server, if consecutive n event elements are recognized as generated within the pre-specified reference time, the second server in performing processes of determining a pre-defined m-th event element among the recognized n event elements as a detected event and of setting an n-th event element as a reference event element, and performing or supporting, by the first server, if another event element is recognized as generated after the time of the generation of the reference event element and if all consecutive n event elements, with the another event element as an n-th event element, are generated after the time of the generation of the reference event element and if a difference between a time of generation of a first event element and that of an n-th event element among the consecutive n event elements is same or less than the pre-specified reference time, performing or supporting, by the second server, in performing processes of determining an m-th event element among the consecutive n event elements as a detected event and of setting the n-th event element among the consecutive n event elements as a newly updated reference event element.

10. The method of claim 1, wherein, at the step of (b), if a detection option of the detection policy is a an additional option, detecting or supporting, by the first server, the second server in detecting an event in real-time from the multiple input data according to a an additional algorithm which is determined by referring to a pre-specified reference time p and the preset threshold n; and wherein the detection according to the additional algorithm includes steps of:

setting or supporting, by the first server, the second server in setting a starting time t0 of detection, at which the detection starts, as a starting time t of schedule, and performing or supporting, by the first server, upon a lapse of the pre-specified reference time p from the starting time t of a schedule, if at least n event elements are recognized to be generated during a time from t to t+p, the second server in performing processes of determining at least one of the recognized n event elements as a detected event or time t+p as an event generation time, and of setting t+p as a new starting time t of the schedule and setting or supporting, by the first server, if no n event elements are recognized to be generated during a time from t to t+p, and determining that no event is detected during the time from t to t+p, the second server in setting t+p as a new starting time t of the schedule.

11. The method of claim 1, wherein, at the step of (a), performing or supporting, by the first server, the second server in performing a process of deciding an integrity of the loaded detection policy by using input data for verification.

12. The method of claim 1, wherein the input data includes at least one of text data or binary data.

13. The method of claim 1, wherein the detection policy includes a detection rule set query expressing a rule for detecting an event element in the multiple input data as a query; and wherein, at the step of (b), determining or supporting, by the first server, the second server in determining input data satisfying the detection rule set query among the multiple input data as an event element.

14. The method of claim 1, wherein the detection policy includes a unique field, or a unique field and a unique field threshold x; and wherein, at the step of (b), if the unique field threshold is included in the detection policy, filtering or supporting, by the first server, the second server in filtering x or less input data whose unique field values are the same with one another as one piece of input data and if the unique field threshold is not included in the detection policy, filtering or supporting, by the first server, the second server in filtering the input data whose unique field values are the same as one piece of input data.

15. A first server for detecting a preset type of real-time events, comprising:
 a memory;
 a communication interface for loading a detection policy on the first server or for supporting a second server in loading the detection policy on the second sever; and
 a computer processor for detecting an event in real-time from multiple input data according to the detection policy or for supporting the second server in detecting the event in real-time from multiple input data according to the detection policy; and
 wherein the communication interface supports two or more cluster applications executed by the computer processor, including at least one filtering thread to load the detection policy; and
 wherein the computer processor executes the two or more cluster applications to recognize an event element from the multiple input data according to the detection policy via the at least one filtering thread and also executes an event detection application to detect an event from information regarding the recognized event element according to the detection policy; and
 wherein the computer processor executes the event detection application to detect an event from the multiple input data in real-time by executing at least one algorithm configured to correspond to a detection option of the detection policy; and
 wherein the at least one algorithm during execution accesses a reference time and a pre-set threshold n; and
 wherein the at least one algorithm, when executed, instructs the computer processor to set an event element, which satisfies at least one certain condition, among recognized event elements as a detected event, or instructs the computer processor to set the event element as a reference event element; and
 wherein if the event element is set to a reference event element, the event element set to a reference event element refers to at least one of:
 information on whether another event element, which is considered based on the reference event element, is recognized before or after a predetermined time has elapsed from a time of a generation of the reference event element, and
 information on whether the another event element is recognized before or after the predetermined time has elapsed, with the another event element recognized consecutively for a predetermined amount of time, and then at least part of the another event element has been set as another detected event.

16. The first server of claim 15, wherein the computer processor implements a detection policy management database to retain the detected event.

17. The first server of claim 16, wherein, if a request to apply a change of the detection policy is recognized, the computer processor executes the two or more cluster applications including the at least one filtering thread to load the detection policy and if the request to apply the change of the detection policy is recognized, the computer processor executes the event detection application to acquire the detection policy in order to allow the executed event detection application to detect an event from the information on the recognized event element according to the detection policy.

18. The first server of claim 15, wherein, if a detection option of the detection policy is an additional option, the computer processor detects or supports the second server to detect an event from the multiple input data in real-time according to an additional executed algorithm which is determined by referring to a pre-specified reference time; and
 wherein the detection according to the additional executed algorithm comprises:
 the computer processor, if an event element is recognized as generated, executing or supporting the second server to execute processes to determine the recognized as generated event element as a detected event and to set the recognized as generated event element as a reference event element, and
 the computer processor, if another event element is recognized as generated before a lapse of the pre-specified reference time from the time of the generation of the reference event element, executing or supporting the second server to execute processes to not determine the another event element as a detected event and to set the another event element as a newly updated reference event element, and the computer processor, if another event element is recognized as generated after the lapse of the pre-specified reference time from the time of the generation of the reference event element, executing or supporting the second server to execute processes to determine the another event element as a detected event and to set the another event element as a newly updated reference event element.

19. The first server of claim 15, wherein, if a detection option of the detection policy is an additional option, the computer processor detects or supports the second server to detect an event from the multiple input data in real-time according to an additional executed algorithm which is determined by referring to a pre-specified reference time; and
 wherein the detection according to the additional executed algorithm comprises:
 the computer processor, if an event element is firstly recognized as generated, executing or supporting the second server to execute processes to determine the recognized as generated event element as a detected event and to set the recognized as generated event element as a reference event element; and
 the computer processor, if another event element is recognized as generated before a lapse of the pre-specified reference time from the time of the generation of the reference event element, executing or supporting the second server to execute processes to determine the another event element as a detected event and to set the another event element as a newly updated reference event element, and the computer processor, if another event element is recognized as generated after the lapse of the pre-specified reference time from the time of the generation of the reference event element, executing or supporting the second server to execute processes to not determine the another event element as a detected event and to set the another event element as a newly updated reference event element.

20. The first server of claim 15, wherein, if a detection option of the detection policy is an additional option, the computer processor detects or supports the second server to detect an event from the multiple input data in real-time according to an additional executed algorithm; and
   wherein the detection according to the additional executed algorithm comprises:
      the computer processor, if an event element is recognized as generated, determines or supports the second server to determine the recognized event element as a detected event.

21. The first server of claim 15, wherein, if a detection option of the detection policy is an additional option, the computer processor detects or supports the second server to detect an event in real-time from the multiple input data according to an additional executed algorithm which is determined by referring to a pre-specified reference time and a preset threshold n; and
   wherein the detection according to the additional executed algorithm comprises:
      the computer processor, if consecutive n event elements are recognized as generated within the pre-specified reference time, executing or supporting the second server to execute processes to determine a predefined m-th event element among the recognized n event elements as a detected event and of setting the m-th event element as a reference event element, and
      the computer processor, if consecutive n other event elements are recognized as generated after a time of the generation of the reference event element and all the recognized n other event elements are generated before a lapse of the pre-specified reference time from the time of the generation of the reference event element, executing or supporting the second server to execute processes to not determine the recognized n other event elements as detected events and to set an m-th event element among the recognized n other event elements as a newly updated reference event element, and the computer processor, else if consecutive n other event elements are recognized as generated after the time of the generation of the reference event element and at least one of the recognized n other event elements is generated after the lapse of the pre-specified reference time from the time of the generation of the reference event element, executing or supporting the second server to execute processes to determine an m-th event element among the recognized n other event elements as a detected event and of determining an m-th among the recognized n other event elements as a newly updated reference event element.

22. The first server of claim 15, wherein, if a detection option of the detection policy is an additional option, the computer processor detects or supports the second server to detect an event in real-time from the multiple input data according to an additional executed algorithm which is determined by referring to a pre-specified reference time and a preset threshold n; and
   wherein the detection according to the additional executed algorithm comprises:
      the computer processor, if consecutive n event elements are recognized as generated within the pre-specified reference time, executing or supporting the second server to execute processes to not determine the recognized as generated n event elements as detected events and to set an m-th event element among the recognized n event elements as a reference event element; and
      the computer processor, if consecutive n other event elements are recognized as generated after the time of the generation of the reference event element and all the recognized n other event elements are generated before a lapse of the pre-specified reference time from the time of the generation of the reference event element, executing or supporting the second server to execute processes to determine an m-th event element among the recognized n other event elements as a detected event and to determine an m-th event element among the recognized n other event elements as a newly updated reference event element, and the computer processor, if consecutive n other event elements are recognized as generated after the time of the generation of the reference event element and at least one of the recognized n other event elements is generated after the lapse of the pre-specified reference time from the time of the generation of the reference event element, executing or supporting the second server to execute processes to not determine the recognized n other event elements as detected events and to set an m-th event element among the recognized n other event elements as a newly updated reference event element.

23. The first server of claim 15, wherein, if a detection option of the detection policy is an additional option, the computer processor detects or supports the second server to detect an event in real-time from the multiple input data according to an additional executed algorithm which is determined by referring to a pre-specified reference time and a preset threshold n; and
   wherein the detection according to the additional executed algorithm comprises:
      the computer processor, if consecutive n event elements are recognized as generated within the pre-specified reference time, executing or supporting the second server to execute processes to determine a predefined m-th event element among the recognized n event elements as a detected event and to set an n-th event element as a reference event element; and
      the computer processor, if another event element is recognized as generated after the time of the generation of the reference event element and if all consecutive n event elements, with the another event element as an n-th event element, are generated after the time of the generation of the reference event element and if a difference between a time of generation of first event element and that of an n-th event element among the consecutive n event elements is the same or less then the pre-specified reference time, executing or supporting the second server to execute processes to determine an m-th event element among the consecutive n event elements as a detected event and to set an n-th event element among the consecutive n event elements as a newly updated reference event element.

24. The first server of claim 15, wherein, if a detection option of the detection policy is an additional option, the computer processor detects or supports the second server to detect an event in real-time from the multiple input data according to an additional executed algorithm which is determined by referring to a pre-specified reference time p and a preset threshold n; and
   wherein, according to the additional executed algorithm, the computer processor sets or supports the second server to set a starting time t0 of detection, at which the detection starts, as a starting time t of schedule; and upon a lapse of the pre-specified reference time p from the starting time t of schedule, the computer processor, if at least n event elements are recognized to be generated during a time from t to t+p, executes or supports the second server to execute processes of determining at least one of the recognized n event elements as a detected event or time t+p as an event generation time, and of setting t+p as a new starting time t of schedule and the processor, the processor, if no n event elements are recognized to be generated during a time from t to t+p, executes or supports the second server to execute processes of determining that no event is detected during the time from t to t+p and sets or supports the second server to set t+p as a new starting time t of schedule.

25. The first server of claim 15, wherein the computer processor executes or supports the second server to execute a process to decide an integrity of the loaded detection policy by using input data for verification.

26. The first server of claim 15, wherein the input data includes at least one of text data or binary data.

27. The first server of claim 15, wherein the detection policy includes a detection rule set query expressing a rule for detecting an event element in the multiple input data as a query; and wherein the computer processor determines or supports the second server to determine input data satisfying the detection rule set query among the multiple input data as an event element.

28. The first server of claim 15, wherein the detection policy includes a unique field, or a unique field and a unique field threshold x; and wherein, if the unique field threshold is included in the detection policy, the computer processor filters or supports the second server to filter x or less input data whose unique field values are same with one another as one piece of input data and if the unique field threshold is not included in the detection policy, the processor filters or supports the second server to filter the input data whose unique field values are same as one piece of input data.

* * * * *